United States Patent
Irshad et al.

(10) Patent No.: US 10,852,761 B2
(45) Date of Patent: Dec. 1, 2020

(54) COMPUTING SYSTEM WITH AUTOMATED VIDEO MEMORY OVERCLOCKING

(71) Applicants: Omer Irshad, Vaughn (CA); Mouhanad Alkallas, Mississauga (CA); Hang Zhou, Toronto (CA); Alexander Sabino Duenas, Stouffville (CA); Tsabita Shawnee Rizqa, North York (CA)

(72) Inventors: Omer Irshad, Vaughn (CA); Mouhanad Alkallas, Mississauga (CA); Hang Zhou, Toronto (CA); Alexander Sabino Duenas, Stouffville (CA); Tsabita Shawnee Rizqa, North York (CA)

(73) Assignee: ATI TECHNOLOGIES ULC, Markham (CA)

( * ) Notice: Subject to any disclaimer, the term of this patent is extended or adjusted under 35 U.S.C. 154(b) by 90 days.

(21) Appl. No.: 16/219,396

(22) Filed: Dec. 13, 2018

(65) Prior Publication Data

US 2020/0192420 A1 Jun. 18, 2020

(51) Int. Cl.
*G06F 1/04* (2006.01)
*G06F 1/12* (2006.01)
(Continued)

(52) U.S. Cl.
CPC .............. *G06F 1/08* (2013.01); *G06F 1/26* (2013.01); *G06F 9/3877* (2013.01); *G06T 1/20* (2013.01)

(58) Field of Classification Search
None
See application file for complete search history.

(56) References Cited

U.S. PATENT DOCUMENTS 6,535,986 B1 * 3/2003 Rosno ................... G06F 1/3203
713/400
7,382,366 B1 * 6/2008 Klock ..................... G06F 1/206
345/213

(Continued)

FOREIGN PATENT DOCUMENTS

WO WO-2005073828 A2 * 8/2005 ............... G06F 1/08

OTHER PUBLICATIONS

Sasa Marinkovic; *Command your GPU and control your graphics performance with radeon wattman*; https://community.amd.com/community/gaming/blog/2016/06/29/command-your-gpu-and-control-your-graphics-performance-with-radeon-wattman; Jun. 29, 2016; pp. 1-5.

(Continued)

*Primary Examiner* — Nitin C Patel

(57) ABSTRACT

Various methods and apparatus for graphics processing are disclosed. In one aspect, a method of graphics processing using a computing system is provided. The method includes booting the computing system. After booting the computing system operating video memory of the computing system at a non-overclocked frequency, and prior to rebooting having the computing system sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail.

20 Claims, 7 Drawing Sheets

(51) Int. Cl.
    *G06F 5/06*     (2006.01)
    *G06F 1/08*     (2006.01)
    *G06F 9/38*     (2018.01)
    *G06T 1/20*     (2006.01)
    *G06F 1/26*     (2006.01)

(56) References Cited

U.S. PATENT DOCUMENTS

| | | |
|---|---|---|
| 2005/0225365 A1 | 10/2005 | Wood |
| 2006/0044219 A1 | 3/2006 | Kao et al. |
| 2009/0300343 A1 | 12/2009 | Lan et al. |
| 2009/0300421 A1 | 12/2009 | Lan et al. |
| 2010/0131221 A1 | 5/2010 | Chien |
| 2011/0161706 A1 | 6/2011 | Huang et al. |
| 2013/0219209 A1 | 8/2013 | Chen et al. |
| 2015/0016191 A1 | 1/2015 | Tsai et al. |
| 2017/0328952 A1* | 11/2017 | Huang .................... H03L 7/23 |
| 2018/0188769 A1 | 7/2018 | Chen et al. |

OTHER PUBLICATIONS

AMD; *How to Tune GPU Performance Using Radeon Wattman and RAdeon Chill*; https://support.amd.com/en-us/kb-articles/Pages/DH-020.aspx; Article No. DH-020; 2018; pp. 1-2.

\* cited by examiner

COMPUTING SYSTEM WITH AUTOMATED VIDEO MEMORY OVERCLOCKING

BACKGROUND OF THE INVENTION

Many modern computer systems, such as personal computers, utilize a graphics card to produce graphics processing to produce visual displays for the user. Some conventional systems use a graphics card that includes one or more graphics processors and on-card video memory. Other types of conventional systems use system boards that have integrated graphics chips that then make use of ordinary system memory or perhaps on-system board video memory.

Settings to manage the behavior of many conventional computing systems after system boot are typically pulled by the system central processing unit (CPU) from the system basic input output system (BIOS). BIOS is conventionally stored in non-volatile memory on the system board for the computing system. Parameters such as CPU clock speed, memory clock speed, boot device sequence, preferred boot device, etc. are written into the BIOS and pulled up by a program known as a boot loader when the system is initially started. For many conventional personal computers, entry into BIOS involves tapping on a particular keyboard function key or space bar immediately after the power button is engaged so that the system knows to enter BIOS as opposed to loading the operating system.

BRIEF DESCRIPTION OF THE DRAWINGS

The foregoing and other advantages of the invention will become apparent upon reading the following detailed description and upon reference to the drawings in which.

DETAILED DESCRIPTION

Figure 1:
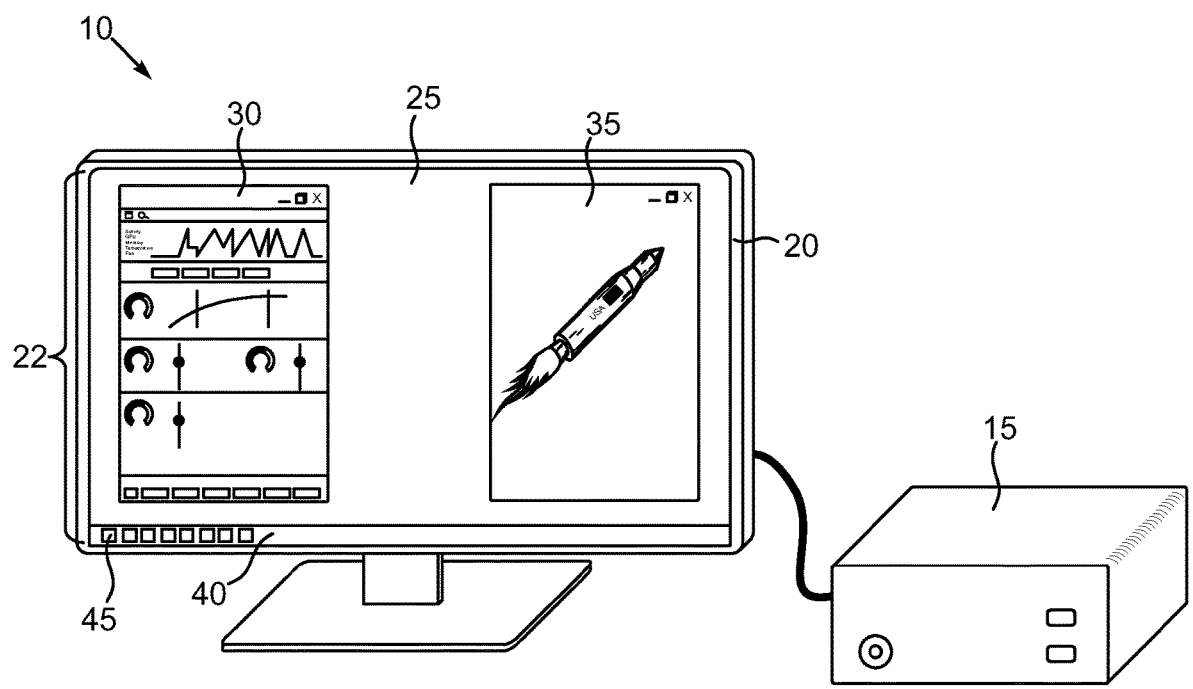
FIG. 1 is a pictorial view of an exemplary arrangement of a computing system.

Many types of computing systems include a graphics processing unit (GPU) or CPU programmed to do graphics processing. Frequently the systems also include video memory, which is used by the CPU or GPU to read and write data and ultimately to display graphic images to a user on a visual display. Modern GPUs are typically fabricated to operate within a stable range of frequencies. However, it is possible to operate modern processors outside of the standard frequency range by either overclocking or underclocking the processor. It is also possible to overclock the video memory associated with a computing system. Some types of conventional arrangements, processors and video memory are incorporated into a single structure such as a video card or graphics board. In other systems, the processor and video memory can be integrated into a single device or can be located in disparate locations such as on different boards and interconnected through some sort of interface. Conventional overclocking of video memory is typically done in software manually after system boot. A conventional overclocking utility, such as WATTMAN, does enable the user to incrementally overclock a video memory manually by selecting individual clock frequencies. This can be a time consuming exercise and can lead to system crash if done incorrectly. In addition, changes made to a video memory operating frequency in BIOS typically requires a separate reboot each time a change is made which results in a delay in getting the system up and running. Entry into a computing systems BIOS is frequently done by way of hot key or other keyboard key selection. The process of entering and navigating through a computing systems BIOS screens can be a simple exercise for a very experienced user but a somewhat daunting experience for a more novice user.

The disclosed arrangements provide for the automated overclocking of a computing system video memory while maintaining system stability and without having to enter into the systems BIOS. Video tuning software is described herein that includes an interface to enable the user to select manual post-boot video memory tuning or to select automatic video overclocking. Where automatic overclocking for video memory is selected, the system uses one of a couple of algorithms to increment the video memory clock frequency through a series of overclocking frequencies, and after each increment, testing the stability of the video memory, that is, the data writing/reading of the video memory to look for errors suggesting that the selected overclock frequency produces unstable operation. The system then automatically decrements to a stable overclock frequency when errors are detected. All of this automatic overclocking happens with great speed and without further input from the user.

In accordance with one aspect of the present invention, a method of graphics processing using a computing system is provided. The method includes booting the computing system. After booting the computing system operating video memory of the computing system at a non-overclocked frequency, and prior to rebooting having the computing system sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail.

In accordance with another aspect of the present invention, a computing system for displaying video is provided. The computing system includes video memory and a processor. The processor is programmed to provide a user interface on a display after system boot. The user interface includes a first user selectable button to enable the user to manually tune the clock frequency of the video memory and a second user selectable button to enable the computing system to sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail.

In accordance with another aspect of the present invention, a computer readable medium that has computer readable instructions for performing a method is provided. The method includes after booting the computing system operating video memory of the computing system at a non-overclocked frequency, and prior to rebooting having the computing system sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail.

In the drawings described below, reference numerals are generally repeated where identical elements appear in more than one figure. Turning now to the drawings, and in particular to FIG. 1, therein is shown a pictorial view of an exemplary arrangement of a computing system 10 that includes a computer 15 and a video display or monitor 20 connected to the computer 15. In alternative embodiments, the computer 15 and the video display 20 may be integrated into a single case. The video display 20 may be any of a variety of technologies such as LCD, OLED, plasma or other technologies. The video display 20 can be capable of dynamic refresh. The computing system 10 can include various input devices such as mice and keyboards which are not shown for simplicity of illustration. The computing system 10 could be embodied as a conventional desktop, notebook or server computer system, mobile (e.g., handheld or palm/pad type) computer system, intelligent television, set top box, computer kiosk or any other computing platform. Thus, the terms "computer system" as used herein contemplates various levels of device integration as well as embedded systems or x86-based.

The computer 15 may utilize one or more operating systems such as Windows®, Linux, IOs or others. Indeed, the techniques described herein can be, in many ways, platform agnostic. In this illustrative embodiment, operating system software is displaying a surface 22 or content on the display 20 that includes a desktop 25, two exemplary windowed applications 30 and 35 that are open and some task bar 40 that includes some number of icons 45. The applications 30 and 35 can, of course, number more than two and indeed can be between one and some unspecified number. The combination of the desktop 25 and the opened windowed applications 30 and 35 make up the composited surface 22 that can be dynamically refreshed. Optionally, one or both of the applications 30 and 35 and others can run in full screen mode.

Figure 2:
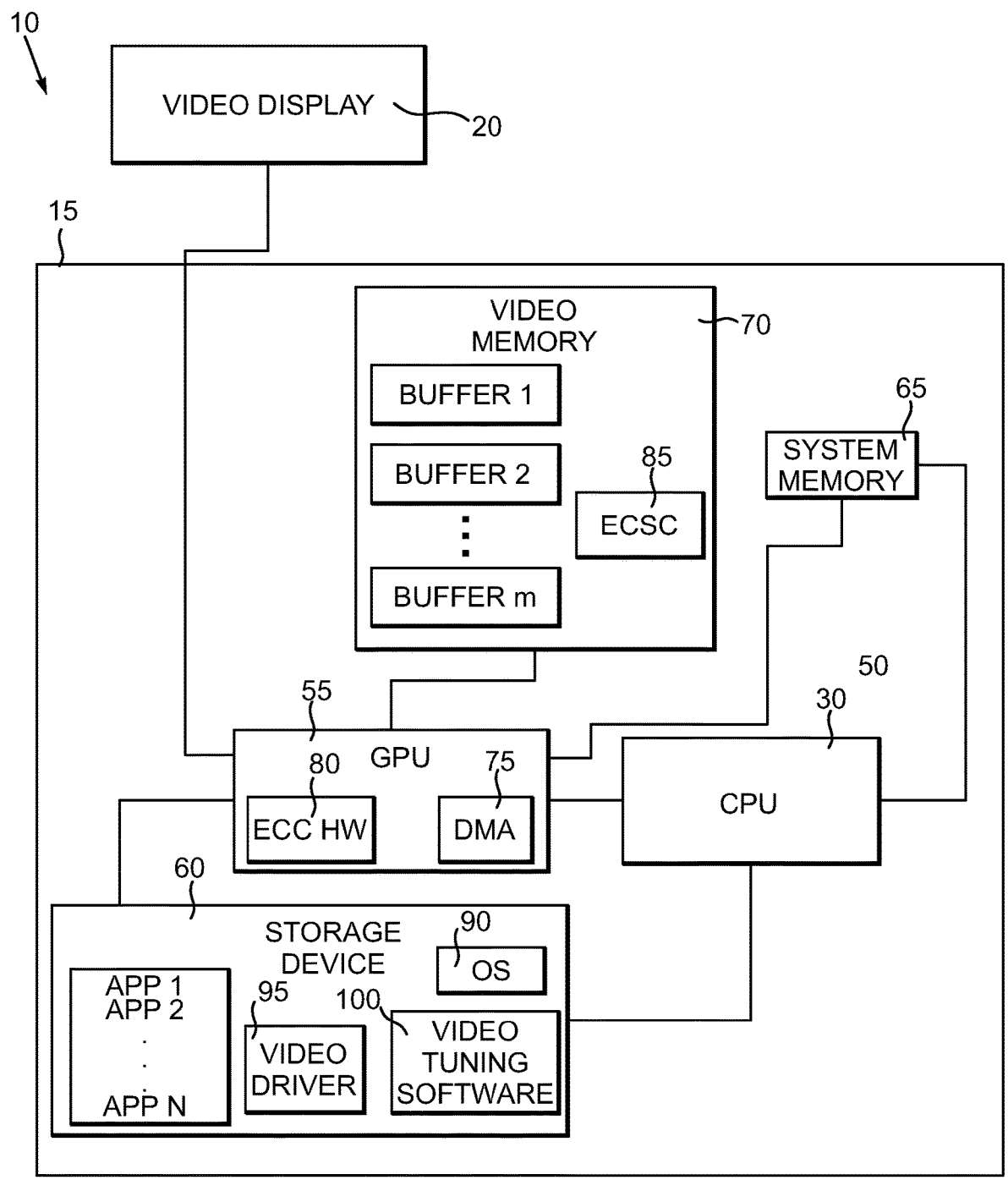
FIG. 2 is a block diagram of the exemplary computing system depicted in FIG. 1.

Additional details of the computing system 10 may be understood by referring now also to FIG. 2, which is a block diagram. The computing system 10 can include the aforementioned video display 20, a central processing unit (CPU) 50, a graphics processing unit (GPU) 55, a storage device 60, system memory 65 and video memory 70. The CPU 50 can be an integrated circuit dedicated to video processing, a microprocessor, a GPU, an accelerated processing unit (APU) that combines CPU and GPU functions, an application specific integrated circuit or other device. An exemplary APU can include fixed function cores for compression, decompression, pre-imposed or post-imposed processing tasks or others. Indeed, the CPU 50 can consist of multiple examples of such integrated circuits operating in parallel or otherwise. The GPU 55 can be an integrated circuit dedicated to video processing or any of the types of circuits listed above for the CPU 50. The GPU 55 includes a direct access to memory (DMA) 75 logic block, which enables the GPU 55 to directly access (read/write) the system memory 65 without having to go through the CPU 50. In addition, the GPU 55 includes error correction hardware (EC HW) 80. The EC HW 80 detects when memory errors, such as unexpected bit flips, occur in the video memory 70. The GPU 50 and the video memory 70 can be mounted on a common board, such as a circuit card (not shown) or on different but interconnected boards or even fabricated on the same die.

The storage device 60 is a computer readable medium and can be any kind of hard disk, optical storage disk, solid state storage device, ROM, RAM or virtually any other system for storing computer readable media in a non-transitory fashion. The system memory 65 can be one or more discrete memory devices, such as DRAM, SRAM, VRAM or flash chips, boards or modules or onboard cache(s) or combinations of these. The video memory 70 can be one or more discrete memory devices, such as DRAM, SRAM, VRAM or flash chips, boards or modules or onboard cache(s) or combinations of these. The video memory 70 can be subdivided into, among various things, plural buffers, buffer 1, buffer 2 . . . buffer m. The buffers buffer 1, buffer 2 . . . buffer m are addressable memory locations that can be used for double, triple or other buffering for displaying video frames. In addition, the video memory 70 includes error correction storage cells (ECSC) 85 for storing parity information that is used by the EC HW 80 of the GPU 55 as described in more detail below.

In addition, the computing device 10 includes an operating system (OS) 90, video driver software 95, video tuning software 100, and can include plural applications, which are abbreviated APP 1, APP 2 . . . APP n, and which can be drivers, software applications, or other types of applications. For example, the video tuning software 100 when opened can correspond to the windowed application 30 and APP 1 when opened can correspond to the windowed application 35 shown in FIG. 1. The OS 90, the video driver software 95, the video tuning software 100 and the applications APP 1 . . . APP n can be stored on the storage device 55. As noted above, the OS 90 can be any of a great variety of different operating systems. The video driver software 95 can similarly be suitable for various different types of operating system platforms. The video tuning software 100 allows the user to tune various video parameters, such as GPU clock speed, video memory clock speed, cooling fan speed and a variety of others. In addition, the video tuning software includes the capability to allow the user to select automatic video memory overclocking wherein the computing system 10 automatically finds a highest stable overclocking frequency for the video memory 70.

The video tuning software 100 can be launched in a variety of ways. In one example, the video tuning software can 100 can operate as a background service that launches on system start up. In another option, the video tuning software 100 can be manually launched by user selection of a menu or icon. In still another option, the video tuning software 100 can include an applet that senses when video content is being played and upon playback detection generates an onscreen icon (not shown). The applet can operate as a background service that launches on system start up.

Figure 3:
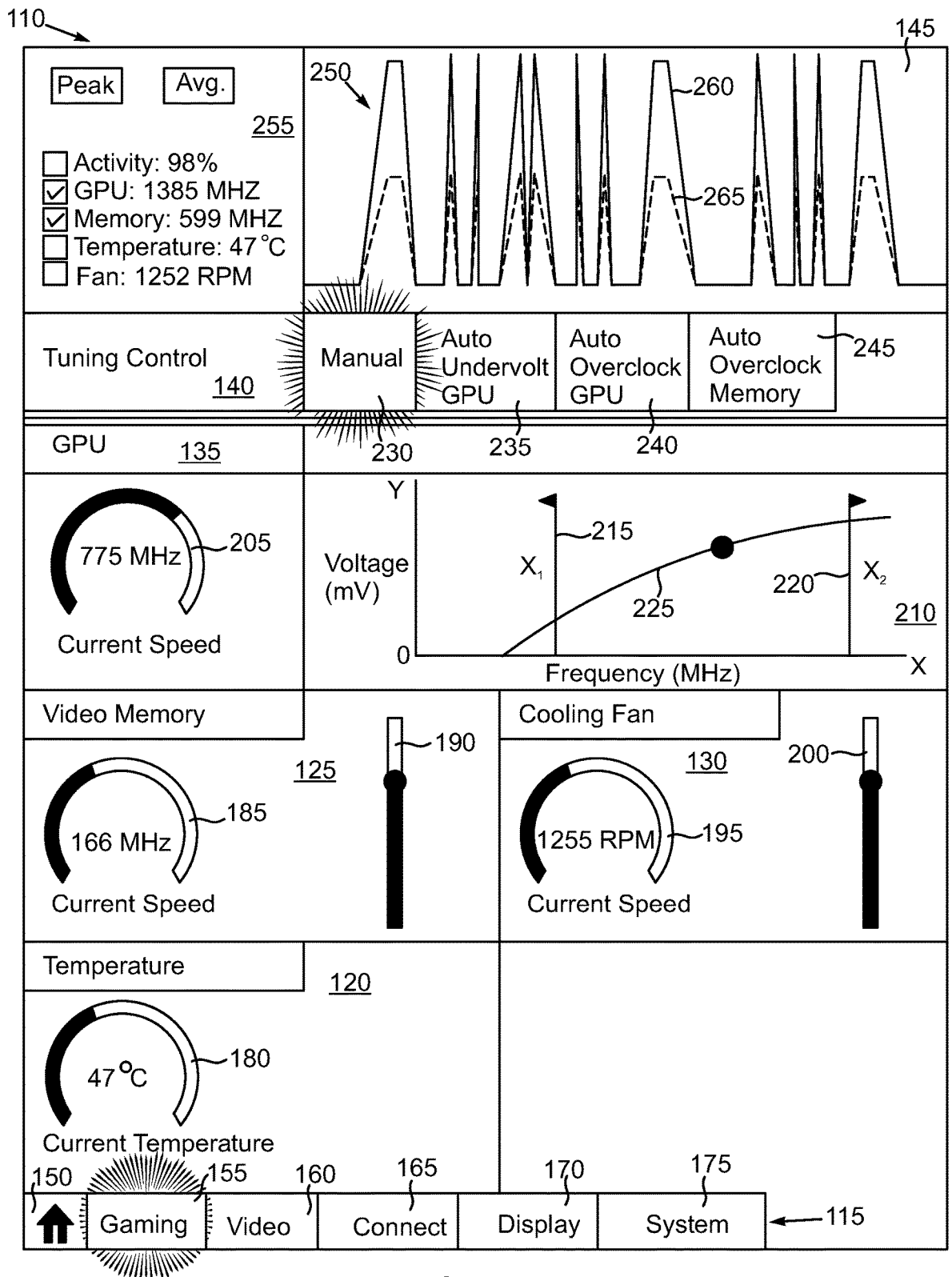
FIG. 3 is a visual depiction of an exemplary user interface for video tuning.

FIG. 3 is a visual depiction of an exemplary arrangement of a user interface 110 generated by the video tuning software 100 depicted schematically in FIG. 2 and just described. Basic navigation buttons, such as full screen, minimize, close, etc., are omitted for simplicity of illustration. The interface 110 is sub-divided into plural panels: a histogram panel 145, a tuning control panel 120, a GPU panel 125, a video memory panel 130, a cooling fan panel 135, a temperature indication panel 140 and a mode panel 115. The mode panel 115 includes plural user selectable buttons namely, a home button 150, a gaming mode button 155, a video mode button 160, a connect mode button 165, a display mode button 170 and a system mode button 175. The home button 150, the gaming mode button 155, the video mode button 160, the connect mode button 165, the display mode button 170 and the system mode button 175, as well as the other buttons and sliders of the interface 110 to be described below, are user selectable by any suitable input device, such as mouse, keyboard, gesture, touch input or other. Assume for the purposes of illustration that the panels depicted in FIG. 3 above the mode panel 115 are displayed as a result of user selection of the gaming button 155 (note the highlighting). The temperature panel 120 includes a temperature gauge 180 and also provides a numerical read out of the current system temperature. The video memory panel 125 includes a memory clock speed gauge 185 and also provides a numerical read out of the current memory clock speed. For manual adjustments, the video memory panel 125 includes a slider 190. The cooling fan panel 130 includes a cooling fan speed gauge 195 and also includes a numerical read out of the current fan speed. The cooling fan panel 130 also includes a slider 200 to permit manual adjustment of the cooling fan speed. The GPU panel includes a GPU clock speed gauge 205 that also includes a numerical read out of the current GPU clock speed. To the right of the GPU clock speed gauge 205 is a GPU clock speed adjustment sub-panel 210 that permits the user to manually adjust the GPU clock speed by way of movable sliders 215 and 220. When in manual mode, the user is able to move the sliders 215 and 220 to set a desired GPU frequency range and that range is plotted as a function of GPU voltage and shown for a variety of different relationships between frequency and voltage according to the displayed plot 225.

The tuning control panel 140 includes selectable buttons for various tuning modes, such as a manual button 230, an auto undervolt GPU button 235, an auto overclock GPU button 240 and an auto overclock memory button 245. FIG. 3 depicts the manual button 230 selected (note the highlighting). When the manual button 230 is selected, the various parameters that can be user controlled, such as the GPU clock speed, video memory clock speed and cooling fan speed can be manipulated by the user by way of the various sliders 215 and 210 for GPU speed, and the sliders 190 and 200 for the video memory speed control and cooling fan speed, respectively. As described in more detail below, when the auto overclock memory button 245 is selected, the various tunable elements such as the GPU speed, memory speed and fan speed will be disabled, the video memory panel 125, the cooling fan panel 130, and the GPU panel 135 will be grayed out, and video memory overclocking will be performed in an automated fashion. Finally, the histogram panel 145 includes a histogram sub-panel 250 that depicts histograms for various parameters. The histogram panel 145 includes a parameter display sub-panel 255, which includes a list of user selectable parameters that can be displayed in histogram format in the histogram sub-panel 250. For example, the parameter display sub-panel 255 can include activity, GPU speed, memory speed, temperature and fan speed and in this depiction, only the GPU speed and memory speed have been selected and thus the histogram sub-panel 250 is only currently displaying the histogram for the GPU speed 260 and the histogram 265 for the memory speed. In addition, the user can select peak or average in the parameter display sub-panel 255 to have the histogram sub-panel 250 display the plots 260 and 265 as either peak or average plots.

Figure 4:
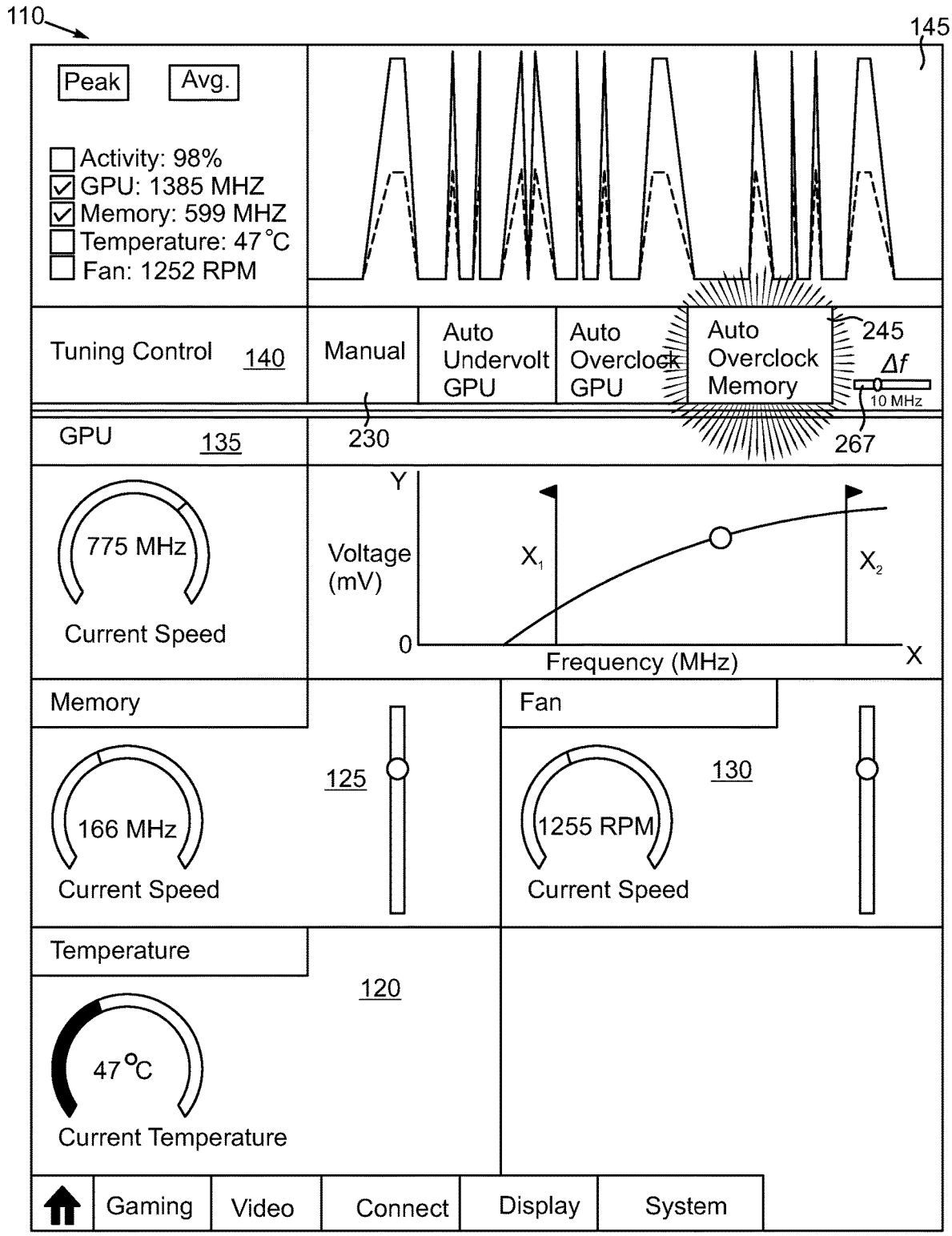
FIG. 4 is a diagram like FIG. 3 but depicting a different mode of operation.

As noted above, FIG. 3 depicts the user interface 110 with the manual button 230 selected (note the highlighting) and thus in manual tuning mode. However, and also as noted above, the interface 110 includes an auto overclock memory button 245 that can be user selected. FIG. 4 depicts the interface 110 after the user has selected the auto overclock memory button 245 (note highlighting) of the tuning control panel 140. When the auto overclock memory button 245 is selected, the video memory panel 125, the cooling fan panel 130 and the GPU panel 135 are disabled and grayed out. The temperature panel 120 is not grayed out. However, in an alternative arrangement it could also be grayed out as desired. In addition, the histogram panel 145 is not grayed out or disabled but could be in an alternative arrangement. An optional frequency increment Δf selector 267 can be enabled and displayed when the auto overclock memory button 245 is selected. The frequency increment Δf selector 267 can be a slider as shown or other type of tuning tool. The frequency increment Δf selector 267 provides the user the option to select a particular frequency increment Δf that the computing system 10 (see FIGS. 1 and 2) uses during an auto overclock alrogithm to be describe in more detail below.

Figure 5:
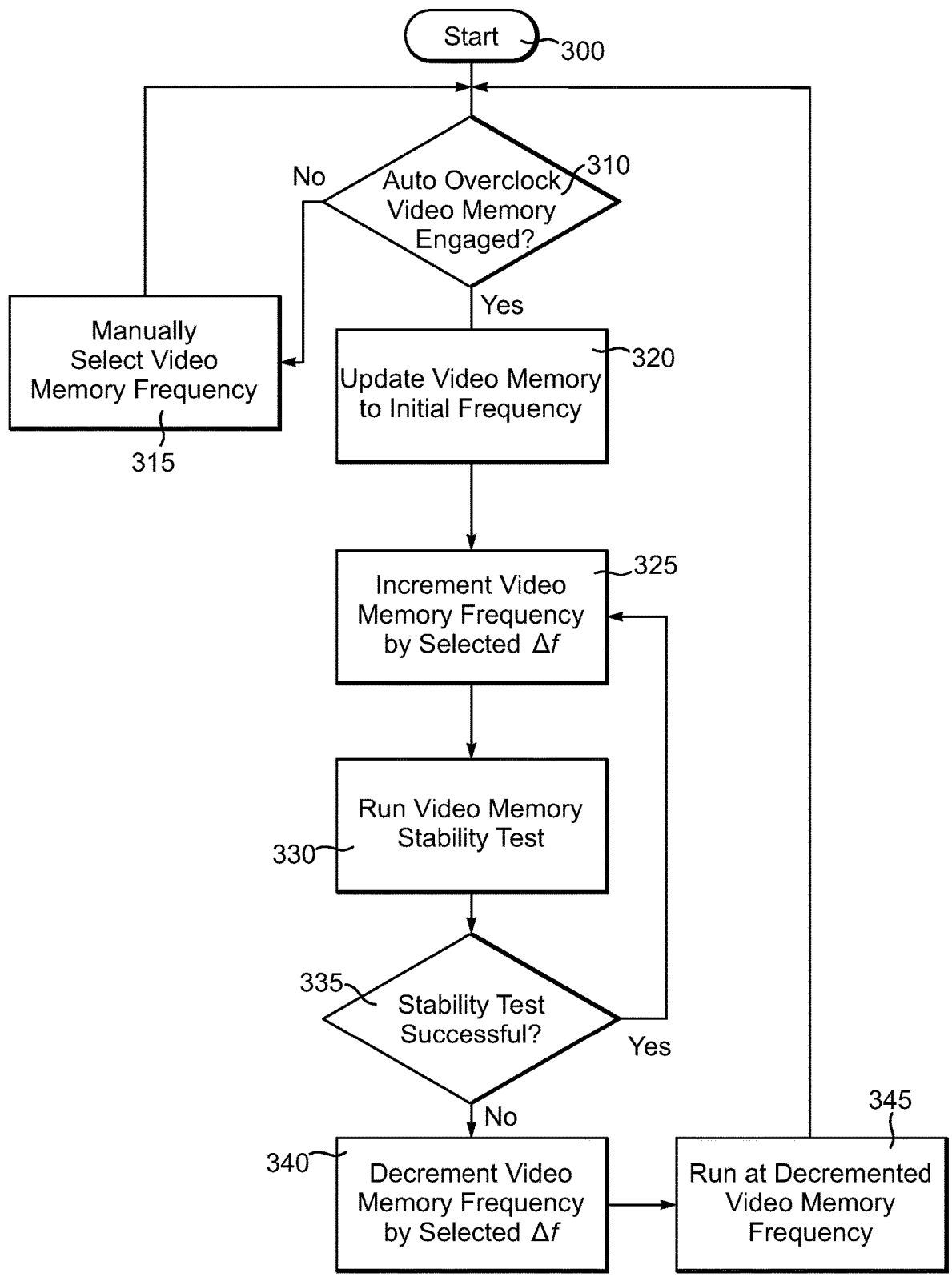
FIG. 5 is a flow chart depicting exemplary video memory tuning.

A process flow for utilizing either the auto overclock memory button functionality via the auto overclock memory button 245 or the manual tuning via the manual button 230 can be understood by referring now to FIGS. 2 and 4 and also to the flow chart depicted in FIG. 5. At start step 300 shown in FIG. 5, the computing system 10 depicted in FIG. 1 is booted, the video driver 95 is started and the video tuning software 100 is started. The interface 110 is generated for display to the user by the video tuning software 100. At step 310, the video tuning software 100 determines if the auto overclock memory button 245 has been selected by the user. At step 310 if the auto overclock video memory button 245 has not been selected, that is, if the user selects the manual button 230, then the process proceeds to step 315 and the user manually selects video memory frequency by, for example, operating the slider 190 depicted in FIG. 3 of the video memory panel 125 to manually select the video memory frequency. If, however at step 310, the user has selected the auto overclock memory button 245, then automated video memory overclocking commences. Thus, at step 320, the computing system 10 updates the video memory to an initial frequency, which is typically the highest non-overclocked frequency within a select set of available video memory clock frequencies. In some arrangements, there can be eight possible initial frequencies. In other arrangements there can be three initial possible frequencies. Assume just for the purposes of this example that the initial video memory frequency is set to 200 MHZ at step 320.

Next at step 325, the video memory clock frequency is incremented by a selected change in frequency Δf prior to rebooting. The value of Δf can be programmed by way of registry key or by otherwise introducing the value into the settings files of the OS 90 or user selectable by way of the frequency increment Δf selector 267 depicted in FIG. 4. Assume for the purposes of illustration that the selected change in frequency Δf is 10 MHz. Thus, at step 325 the initial frequency of 200 MHZ would be incremented to 210 MHZ. Next, at step 330, a video memory stability test is performed. As described in more detail below, the video memory stability test 330 can be performed using various algorithms. Next, at step 335, the video driver 90 determines if the video memory stability test from step 330 was successful. If the video memory stability test from step 330 was successful, then that is an indication that the incremented frequency 210 MHZ was not so fast as to introduce unacceptable errors in the movement of video memory data and thus the process reverts back to step 325 to again increment the video memory by Δf (say to 220 MHZ) and steps 330 and 335 are repeated. If on the other hand, at step 335 the memory stability test from step 330 is determined to be unsuccessful then the process proceeds to step 340 and the video memory frequency is decremented to a previous frequency at which the video memory 70 did not fail the stability test 330. This could be done by decrementing the clock frequency by the value Δf to return the video memory frequency back to the last frequency that successfully passed the stability test at step 330, or some other prior frequency that did not produce stability failure could be selected. Indeed, the computing system 10 can store the overclock frequencies that passed stability and then selected from any one of them. Then the system is run at step 345 at the decremented video memory frequency. At this point, the process returns to step 310 and will proceed accordingly whether or not auto overclock video memory 245 is engaged or not. The computing system 10 (see FIGS. 1 and 2) can be programmed to store the last stable video memory clock setting on power down and then use that stored last stable video memory clock setting on power up.

Figure 6:
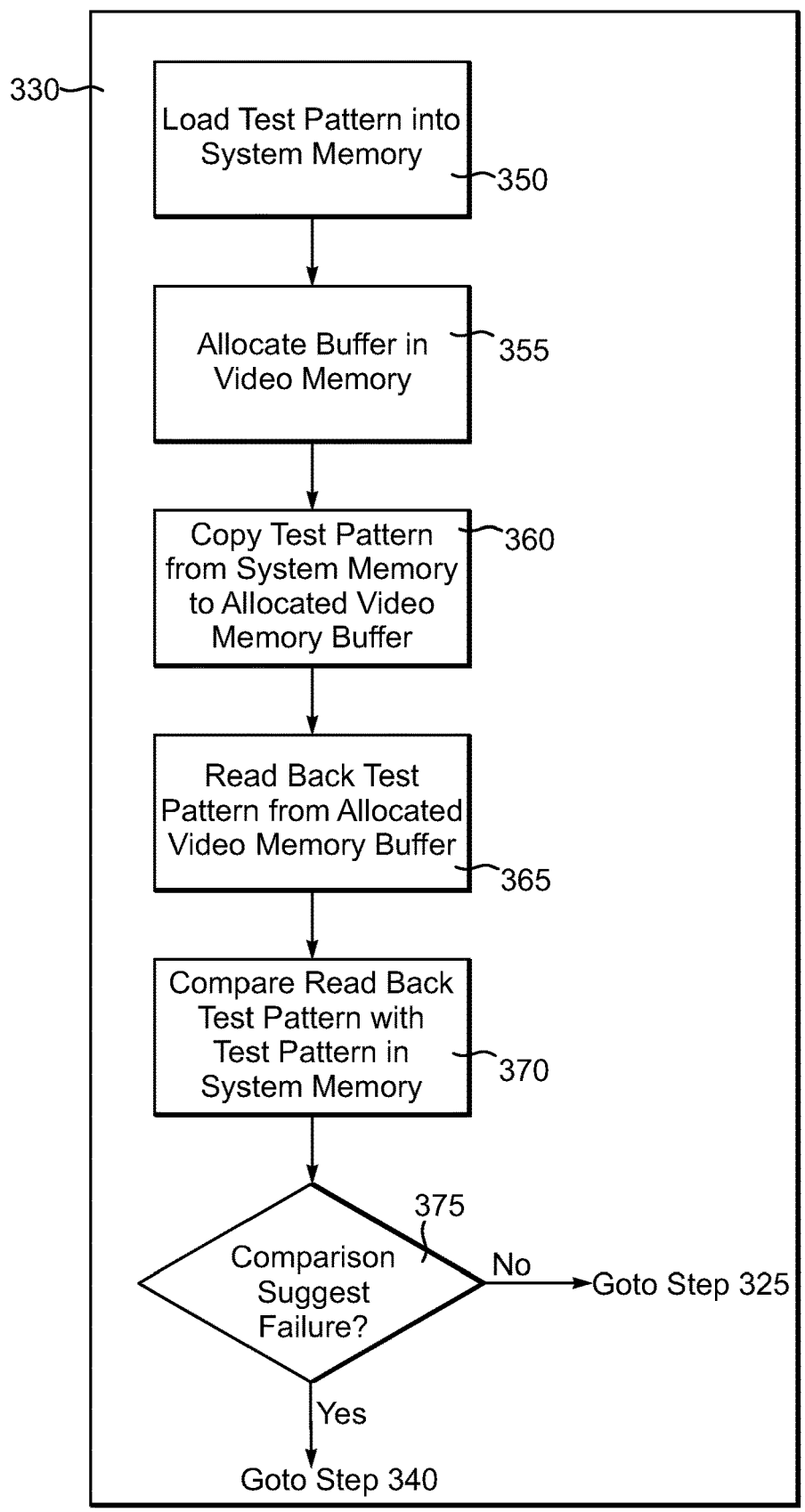
FIG. 6 is a flow chart depicting one exemplary memory stability testing process.

One exemplary video memory stability test step 330 shown in FIG. 5 will now be described in conjunction with FIG. 2 and to the flow chart depicted in FIG. 6. The video memory stability test step 330 begins at step 350 with the loading of a test pattern into system memory. The test pattern is a large of group of numbers, preferably not or not primarily 1's and 0's, written to the system memory 65. The size of the test pattern is preferably proportional to the size of the video memory 70 and large enough in size to cross over into multiple memory channels if the system memory 65 is multi-channel. If the OS 90 and the video drive 95 are written in the C programming language, then the test pattern can be pulled from a .h file that the video driver 95 loads into system memory 65 after system boot. The test pattern can be Do an insert about the test pattern itself. Next, at step 355, a buffer is allocated in the video memory 70. For example, Buffer 1 in the video memory 70 can be allocated for the test pattern that has been previously loaded into the system memory 65 at step 350. Next, at step 360, the test pattern that is in system memory 65 is copied to the allocated memory buffer, Buffer 1 in the video memory 70. It should be noted that the allocation of the Buffer 1 in step 355 is performed by the video driver 95. The test pattern is copied from system memory 65 to the allocated video memory buffer, Buffer 1 by the DMA 75 of the GPU 55. This is done by way of the command processor engine of the GPU 55. Next, at step 365, the test pattern is read back from Buffer 1 by the video driver 95. Next, at step 370, the read back test pattern from Buffer 1 is compared with the original test pattern still resident in system memory 65. This comparison is done again by the video driver 95. At step 375, if the comparison of the read back test pattern from Buffer 1 suggests a failure, that is, if there is a significant mismatch between the read back test pattern from Buffer 1 and the original test pattern in system memory 65, then the process proceeds to step 340 in FIG. 5. Conversely, if the comparison at step 375 does not suggest a failure then the process proceeds from step 375 back to step 325 in FIG. 5. As little as one pixel mismatch can be deemed enough to flag a failure.

Figure 7:
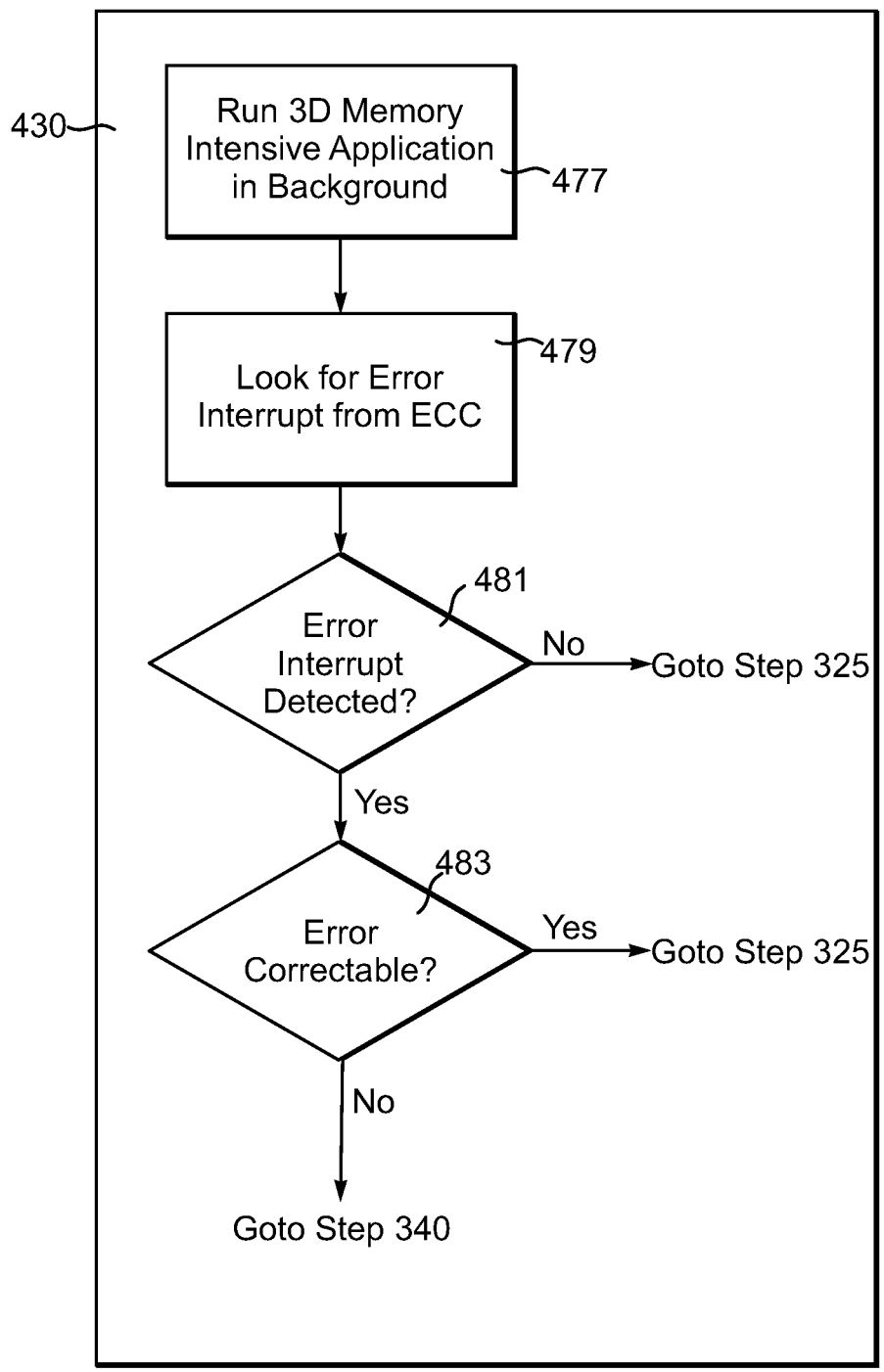
FIG. 7 is a flow chart depicting another exemplary video memory stability testing process.

An alternate exemplary video memory stability test, step 430, can be understood by referring now to FIGS. 1 and 2 and the flow chart depicted in FIG. 7. This alternate stability test 430 begins at step 477 by running a 3D memory intensive application in the background. This can, for example, correspond to the windowed application 35 depicted in FIG. 1, which requires one or more types of 3D graphics video processing involving intensive 3D memory data. Next at step 479, the GPU 55 looks for error interrupts from the ECSC 85. This involves the EC HW 80 of the GPU 55 shown in FIG. 2 examining the contents of the ECSC 85 in the video memory 70. The first error interrupt signifying an uncorrectable error can be deemed significant enough to be flagged as a failure. If at step 481, errors are detected after examining the ECSC 85, then the process proceeds to step 483 and the GPU 55 makes a determination whether the detected errors are correctable. If at step 485 the GPU 55 determines that the detected errors are correctable then the process proceeds to step 325 in FIG. 5. The correctability determination can be based on repetition, parity, checksum or other methods. If however, at step 483 the GPU 55 determines that the errors are not correctable then the process proceeds to step 340 in FIG. 5. If, however, at step 481, no error interrupts are detected by the EC HW 80 of the GPU 55 in FIG. 2 then the process proceeds at that point back to step 325 in FIG. 5.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of graphics processing using a computing system, comprising:
  booting the computing system, the computing system including system memory;
  after booting the computing system operating video memory of the computing system at a non-overclocked frequency;
  prior to rebooting having the computing system sequentially increment the non-overclocked frequency of the video memory by a selected change in frequency through a series of overclocked frequencies, after each frequency incrementing writing data to the video memory and stability testing of the video memory data writing, and if the stability testing fails then decrementing the frequency of the video memory to a previous overclocked frequency at which the stability testing did not fail; and
  wherein the stability testing includes loading a test pattern into the system memory, copying the test pattern from the system memory to the video memory, reading back the test pattern from the video memory and comparing the test pattern read back from the video memory with the test pattern copied from the system memory for errors.

2. The method of claim 1, comprising decrementing the frequency of the video memory by the selected change in frequency to the most recent previous overclocked frequency at which the stability testing did not fail.

3. The method of claim 1, wherein the selected change in frequency is user selectable.

4. The method of claim 1, wherein the video memory comprises plural buffers, the method comprising allocating one of the buffers for the test pattern to be copied from the system memory.

5. The method of claim 1, wherein the frequency incrementing and decrementing and the stability testing is performed by a CPU, a GPU or an APU of the computing system.

6. A computing system for displaying video, comprising:
video memory;
a processor programmed to provide a user interface on a display after system boot, the user interface including a first user selectable button to enable the user to manually tune a clock frequency of the video memory and a second user selectable button to enable the computing system to sequentially increment the clock frequency of the video memory by a selected change in frequency through a series of overclocked frequencies, after each frequency incrementing writing data to the video memory and stability testing of the video memory data writing, and if the stability testing fails then decrementing the frequency of the video memory to a previous overclocked frequency at which the stability testing did not fail; and
wherein the stability testing includes loading a test pattern into the system memory, copying the test pattern from the system memory to the video memory, reading back the test pattern from the video memory and comparing the test pattern read back from the video memory with the test pattern copied from the system memory for errors.

7. The computing system of claim 6, wherein the processor is programmed to decrement the frequency of the video memory by the selected change in frequency to the most recent previous overclocked frequency at which the stability testing did not fail.

8. The computing system of claim 6, wherein the selected change in frequency is user selectable.

9. The computing system of claim 6, wherein the video memory comprises plural buffers, the processor programmed to allocate one of the buffers for the test pattern to be copied from the system memory.

10. The computing system of claim 6, wherein the processor comprises a CPU, a GPU or an APU.

11. A non-transitory computer readable medium having computer readable instructions for performing a method with a computing system having system memory, comprising:
after booting the computing system operating video memory of the computing system at a non-overclocked frequency;
prior to rebooting having the computing system sequentially increment the frequency of video memory by a selected change in frequency through a series of overclocked frequencies, after each frequency incrementing writing data to the video memory and stability testing of the video memory data writing, and if the stability testing fails then decrementing the frequency of the video memory to a previous overclocked frequency at which the stability testing did not fail; and
wherein the stability testing includes loading a test pattern into the system memory, copying the test pattern from the system memory to the video memory, reading back the test pattern from the video memory and comparing the test pattern read back from the video memory with the test pattern copied from the system memory for errors.

12. The non-transitory computer readable medium of claim 11, wherein the method comprises decrementing the frequency of the video memory by the selected change in frequency to the most recent previous overclocked frequency at which the stability testing did not fail.

13. The non-transitory computer readable medium 11, wherein the selected change in frequency is user selectable.

14. The non-transitory computer readable medium of claim 11, wherein the video memory comprises plural buffers, the method comprising allocating one of the buffers for the test pattern to be copied from the system memory.

15. The non-transitory computer readable medium of claim 11, wherein the frequency incrementing and decrementing and the stability testing is performed by a CPU, a GPU or an APU of the computing system.

16. A method of graphics processing using a computing system, comprising:
booting the computing system;
after booting the computing system operating video memory of the computing system at a non-overclocked frequency;
prior to rebooting having the computing system sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail; and
wherein the computing system includes a processor with error correction hardware and the video memory includes error correction storage cells in communication with the error correction hardware, the stability testing comprising running a 3D memory intensive application, sensing for one or more error interrupts from the error correction hardware, if no error interrupts or error interrupts indicative of correctable errors are detected then deeming the stability test a success or if error interrupts indicative of uncorrectable errors are detected then deeming the stability test a failure.

17. The method of claim 16, wherein error correction hardware examines the contents of the error correction storage cells to determine if an error interrupt must be generated.

18. A computing system for displaying video, comprising:
system memory;
video memory;
processor programmed to provide a user interface on a display after system boot, the user interface including a first user selectable button to enable the user to manually tune a clock frequency of the video memory and a second user selectable button to enable the computing system to sequentially increment the clock frequency of the video memory by a selected change in frequency through a series of overclocked frequencies, after each frequency incrementing writing data to the video memory and stability testing of the video memory data writing, and if the stability testing fails then decrementing the frequency of the video memory to a previous overclocked frequency at which the stability testing did not fail; and
wherein the stability testing includes loading a test pattern into the system memory, copying the test pattern from the system memory to the video memory, reading back the test pattern from the video memory and comparing the test pattern read back from the video memory with the test pattern copied from the system memory for errors.

19. A non-transitory computer readable medium having computer readable instructions for performing a method with a computing system, comprising:
- after booting the computing system operating video memory of the computing system at a non-overclocked frequency;
- prior to rebooting having the computing system sequentially increment the frequency of video memory by a selected change in frequency through a series of overclocked frequencies, after each frequency incrementing writing data to the video memory and testing the stability of the video memory data writing, and if the stability testing fails then decrementing the frequency of the video memory to a previous overclocked frequency at which the stability testing did not fail; and
- wherein the computing system includes a processor with error correction hardware and the video memory includes error correction storage cells in communication with the error correction hardware, the stability testing comprising running a 3D memory intensive application, sensing for one or more error interrupts from the error correction hardware, if no error interrupts or error interrupts indicative of correctable errors are detected then deeming the stability testing a success or if error interrupts indicative of uncorrectable errors are detected then deeming the stability testing a failure.

20. The non-transitory computer readable medium of claim 19, wherein error correction hardware examines the contents of the error correction storage cells to determine if an error interrupt must be generated.

* * * * *